United States Patent
Tsabari et al.

(10) Patent No.: US 11,083,182 B1
(45) Date of Patent: Aug. 10, 2021

(54) DEVICES FOR A PERFORATED, STACKED-MEMBRANE INSECT BAIT STATION WITH A LEAK-PROOF BAIT RESERVOIR

(71) Applicant: WTO Investments, LLC, Dallas, TX (US)

(72) Inventors: Onie Tsabari, Petach-Tikva (IL); Meir Morag, Savion (IL)

(73) Assignee: WTO Investments, LLC, Dallas, TX (US)

( * ) Notice: Subject to any disclaimer, the term of this patent is extended or adjusted under 35 U.S.C. 154(b) by 0 days.

(21) Appl. No.: 17/147,489

(22) Filed: Jan. 13, 2021

(51) Int. Cl.
*A01M 1/02* (2006.01)
*B32B 5/02* (2006.01)
*B32B 3/26* (2006.01)

(52) U.S. Cl.
CPC .............. *A01M 1/02* (2013.01); *B32B 3/266* (2013.01); *B32B 5/022* (2013.01); *A01M 2200/012* (2013.01); *B32B 2255/02* (2013.01); *B32B 2307/726* (2013.01); *B32B 2307/73* (2013.01)

(58) Field of Classification Search
CPC .............. A01M 1/02; B32B 2307/73; B32B 2307/726; B32B 2255/02
USPC .......................................................... 43/131
See application file for complete search history.

(56) References Cited

U.S. PATENT DOCUMENTS

| | | | | |
|---|---|---|---|---|
| 5,318,504 A | * | 6/1994 | Edenbaum | A61L 15/08 602/6 |
| 2002/0069579 A1 | * | 6/2002 | Hyatt | A01M 1/2044 43/131 |
| 2008/0250978 A1 | * | 10/2008 | Baumgart | C09D 7/45 106/287.19 |
| 2010/0074860 A1 | * | 3/2010 | Kupfer | A01M 1/2011 424/84 |
| 2010/0158965 A1 | * | 6/2010 | Beitzel | A01N 25/34 424/405 |
| 2010/0319239 A1 | * | 12/2010 | Kirkland | A01M 1/2011 43/131 |
| 2012/0142814 A1 | * | 6/2012 | Kanagasabapathy | C08K 3/36 523/175 |
| 2012/0288678 A1 | * | 11/2012 | Grube | E04D 5/12 428/145 |

(Continued)

*Primary Examiner* — Claude J Brown
(74) *Attorney, Agent, or Firm* — Reuven K. Mouallem; FlashPoint IP Ltd.

(57) ABSTRACT

The present invention discloses devices for a perforated, stacked-membrane insect bait station with a leak-proof bait reservoir. Such devices include: a protective outer membrane for providing selective access to the bait station; perforations in the membrane, wherein the perforations facilitate easy insect-probe penetration for mosquitoes and other biting flies, and facilitate outward diffusion of volatile components of the bait station; a pierceable support layer for preventing inward water penetration and outward bait leakage via the perforations; an absorbent material for providing a reservoir for containing liquids in the bait station and for restraining bait fluidity; a liquid-based bait core for providing bait to the bait station, the bait core including a bait, an insect toxin, and a solvent, the bait core configured to be absorbed in the absorbent material and to be substantially in contact with the support layer; and a bait reservoir enclosure for housing the bait core.

8 Claims, 6 Drawing Sheets

(56) References Cited

U.S. PATENT DOCUMENTS

| | | | |
|---|---|---|---|
| 2014/0106964 A1* | 4/2014 | Jogikalmath | A01N 25/00 504/100 |
| 2014/0130399 A1* | 5/2014 | Halahmi | A01M 1/02 43/131 |
| 2018/0010009 A1* | 1/2018 | Gibanel | C08G 18/8175 |
| 2018/0371665 A1* | 12/2018 | Lin | D06B 19/0005 |

* cited by examiner

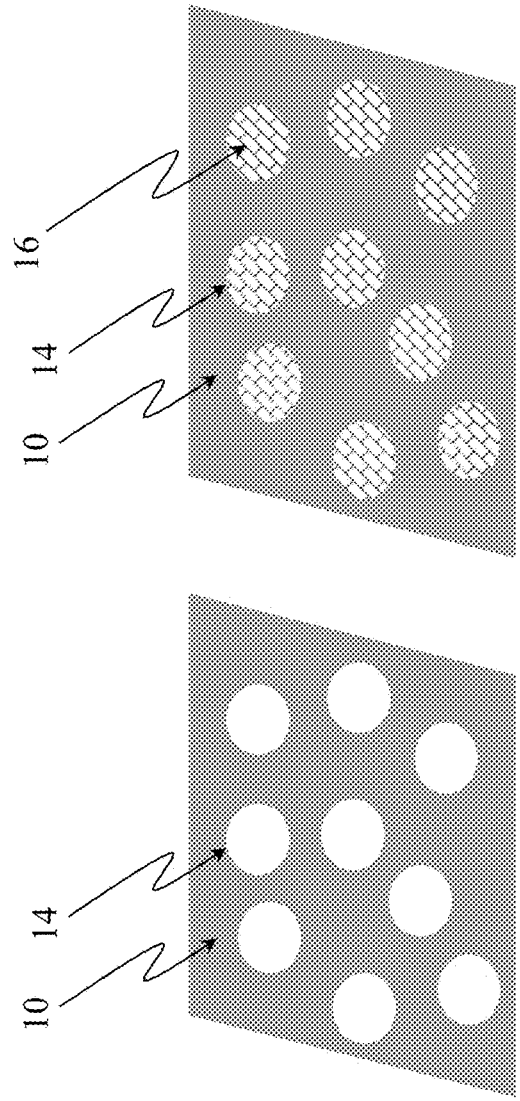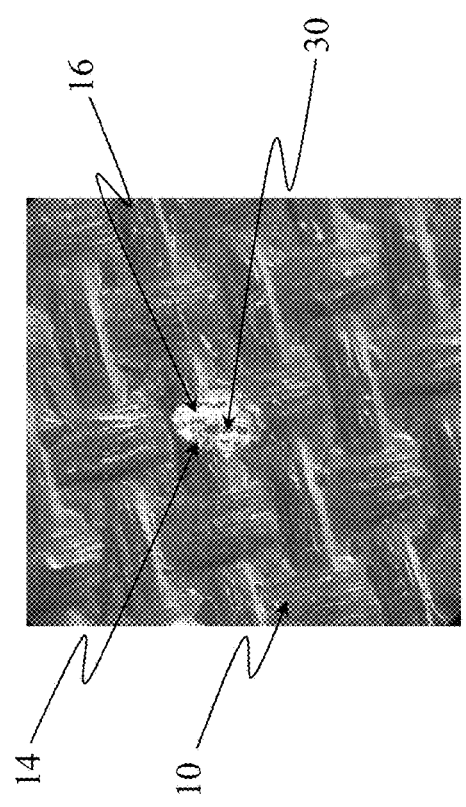
Figure 4A Figure 4B Figure 4C

DEVICES FOR A PERFORATED, STACKED-MEMBRANE INSECT BAIT STATION WITH A LEAK-PROOF BAIT RESERVOIR

FIELD AND BACKGROUND OF THE INVENTION

The present invention relates to devices for a perforated, stacked-membrane insect bait station with a leak-proof bait reservoir. In particular, the present invention relates to bait stations that are suitable for insects having a proboscis including blood-sucking insects such as mosquitoes, and other biting flies.

A bait station is a device that is installed in a way that the targeted insects can feed on the bait, either outdoors or indoors. Typical prior-art bait is a viscous substance or aqueous-gel mixture having an attractant, a substance that the insect uses as food (e.g., sugar or a carbohydrate solution), and a toxin (e.g., boric acid, spinosad, and dinotefurn). The bait formulation may further include preservatives and colorants. Such lures attract insects to feed on the bait, while the toxin enters the insect body during feeding (either by ingestion or contact), causing its death.

In the prior art, membranes have been used as part of durable insect bait stations. U.S. Pat. No. 9,220,255 (with common ownership to the present invention) teaches devices including a membrane for providing access to the bait station, the membrane adapted to be permeable to volatile components, the membrane configured to allow easy insect-probe penetration, and to be resistant to degradation caused by outdoor environmental conditions and/or harsh indoor environmental conditions. The bait station includes a sugar-source bait core for providing bait to the bait station substantially in direct contact with the membrane, which may have inclusions and/or perforations.

Perforated membranes have been found to greatly improved the feeding behavior of biting flies. However, such membranes also increase the penetration of water, such as rain and other precipitation, into the bait reservoir, as well as leakage of the liquid bait through the perforations to the outside of the membrane.

Many prior-art references incorporate sponge layers and protective layers into various configurations for attracting and controlling biting flies. Some examples include: CN Patent Publication No. 106259244A, CN Patent Publication No. 106305658A, CN Patent Publication No. 204070235U, EP Publication No. 3021665B1, JP Patent Publication No. 3144480U, JP Patent Publication No. 2013055901A, and WO Patent Publication No. 2002015683A1. Such references share a common major drawback in that if such devices described therein included perforations in the protective layers, they would be susceptible to two types of leakage that can rapidly degrade the device, the protective layer, and/or the bait itself, thereby greatly impacting the performance and long-term effectivity of the device.

Particularly, such perforated devices can suffer from water penetration of any environmental precipitation, condensation, and/or humidity that can result in moisture entering into the bait reservoir. Such leakage can deteriorate the protective layer to the point of catastrophic failure, as well as contaminate and/or dilute the bait residing beneath the protective layer. Furthermore, such devices can suffer from bait leakage out of the protective layer, resulting in loss of bait, clogging of the membrane, and/or degradation through contamination. Such effects ultimately reduce the longevity and effectivity of such devices, as well as exposing a hazardous bait to non-target insects.

It would be desirable to have such devices for a perforated, stacked-membrane insect bait station with a leak-proof bait reservoir. Such devices would, inter alia, overcome the limitations described above.

SUMMARY OF THE INVENTION

It is the purpose of the present invention to provide devices for a perforated, stacked-membrane insect bait station with a leak-proof bait reservoir.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

Insect baits are typically syrup-like with characteristic liquid properties; thus, such baits are subject to sagging and gravity-driven loss from a reservoir or bait surface. Furthermore, the bait needs to make the food source (e.g., sugars, carbohydrates, blood, artificial blood, blood substitutes, and/or blood surrogates) available to the insects; thus, a tacky exposed surface is often employed, which can quickly build up debris from dust and dead insects adsorbed/attached to the surface. Such debris can result in blocking a large portion of the bait surface, thereby reducing its effectiveness. Exposure to rain can also degrade bait performance by causing loss or deterioration of the bait itself.

Embodiments of the present invention provide a perforated, stacked-membrane insect bait station with a leak-proof bait reservoir characterized, inter alia, by:

(1) easier membrane penetrability by insect probes, including mosquitoes;
(2) improved rain (or other precipitation) erosion resistance (i.e., prevention of water penetration inward toward the bait reservoir);
(3) improved resistance to bait leakage (i.e., outward toward the exterior of the perforations);
(4) improved resistance to degradation by microorganisms; and
(5) better resistance to hydrolysis.

Therefore, according to the present invention, there is provided for the first time a device for a perforated, stacked-membrane insect bait station, the device including: (a) a protective outer membrane for providing selective access to the bait station; (b) perforations in the protective outer membrane, wherein the perforations are configured to facilitate easy insect-probe penetration for mosquitoes and other biting flies, and are configured to facilitate outward diffusion of volatile components of the bait station; (c) a pierceable support layer for preventing inward water penetration via the perforations and for preventing outward bait leakage via the perforations, wherein the protective outer membrane, the perforations, and the pierceable support layer form a stacked-membrane composite layer; (d) an absorbent material for providing a reservoir for containing liquids in the bait station and for restraining bait fluidity; (e) a liquid-based bait core for providing bait to the insect bait station, the liquid-based bait core including a bait, at least one oral and/or contact insect toxin, and a solvent, the bait core configured to be absorbed in the absorbent material and to be substantially in contact with the pierceable support layer; and (f) a bait reservoir enclosure for housing the liquid-based bait core absorbed in the absorbent material.

Alternatively, the device further includes: (g) an adhesive inner membrane, as part of the stacked-membrane composite layer, positioned between the protective outer membrane and the pierceable support layer and in direct contact with opposing sides of the protective outer membrane and the pierceable support layer, the adhesive inner membrane having the perforations identically positioned as in the protective outer membrane.

Alternatively, the perforations have an average diameter of about 100 microns.

Alternatively, the protective outer membrane has a perforation density of about 1 aperture/cm$^2$.

Alternatively, the pierceable support layer is made from a non-woven material.

Most alternatively, the non-woven material has intrinsic hydrophobic characteristics.

Alternatively, the device further includes: (g) a hydrophobic layer for further preventing the inward water penetration through the outer membrane and for further preventing the outward bait leakage from the bait station, the hydrophobic layer, as part of the stacked-membrane composite layer, positioned between the pierceable support layer and the absorbent material and in direct contact with opposing sides of the pierceable support layer and the absorbent material.

Most alternatively, the hydrophobic layer is a coating on the pierceable support layer.

Alternatively, the bait core further includes an odorant.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 4A is a top view of the protective outer membrane with its perforations of the perforated, stacked-membrane insect bait station of FIG. 2, according to embodiments of the present invention;

FIG. 4B is a top view of the protective outer membrane with its perforations of the stacked-membrane insect bait station of FIG. 2 showing the underlying pierceable support layer through the perforations, according to embodiments of the present invention;

FIG. 4C is a top view, close-up image of the protective outer membrane with a single perforation of the perforated, stacked-membrane insect bait station of FIG. 2 showing the underlying pierceable support layer through the perforation, according to embodiments of the present invention;

DESCRIPTION OF THE ILLUSTRATIVE EMBODIMENTS

The present invention relates to devices for a perforated, stacked-membrane insect bait station. The principles and operation for such devices, according to the present invention, may be better understood with reference to the accompanying description and drawings. Exemplary embodiments of the present invention are detailed below in the following experimental studies and results.

Figure 1:
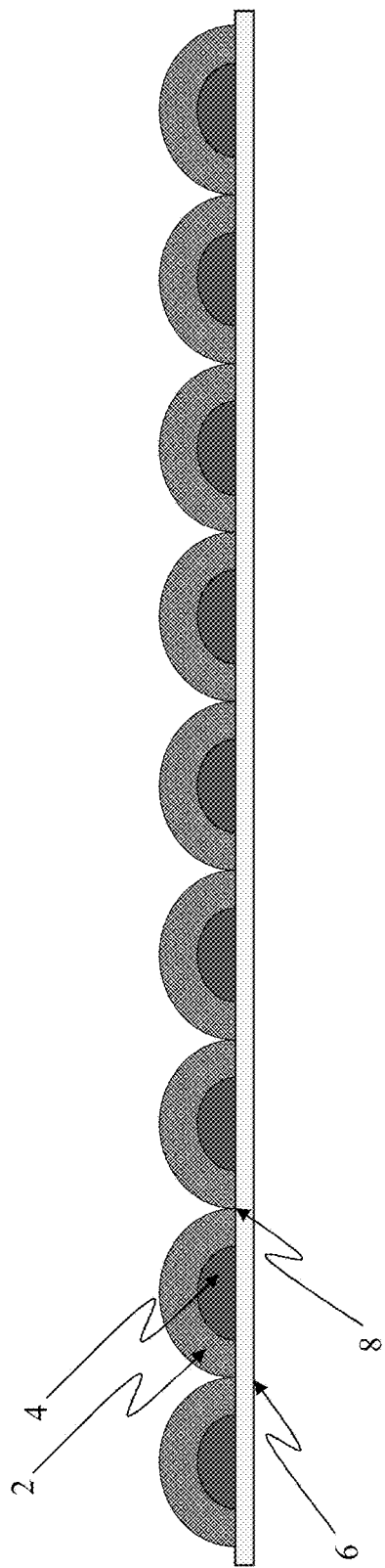
FIG. 1 is a simplified, cross-sectional schematic diagram of a conventional membrane insect bait station, according to the prior art.

Referring now to the drawings, FIG. 1 is a simplified, cross-sectional schematic diagram of a conventional membrane insect bait station, according to the prior art. Contours of the bait station are depicted as a collection of horizontal cylindrical segments ("cells") that are filled with a liquid-based bait core having a sugar source. A membrane 2 is shown enclosing a liquid-based bait core 4 formed on a plastic backing layer 6. Each individual cell is separated from its neighboring cell at bonding seam points 8.

Figure 2:
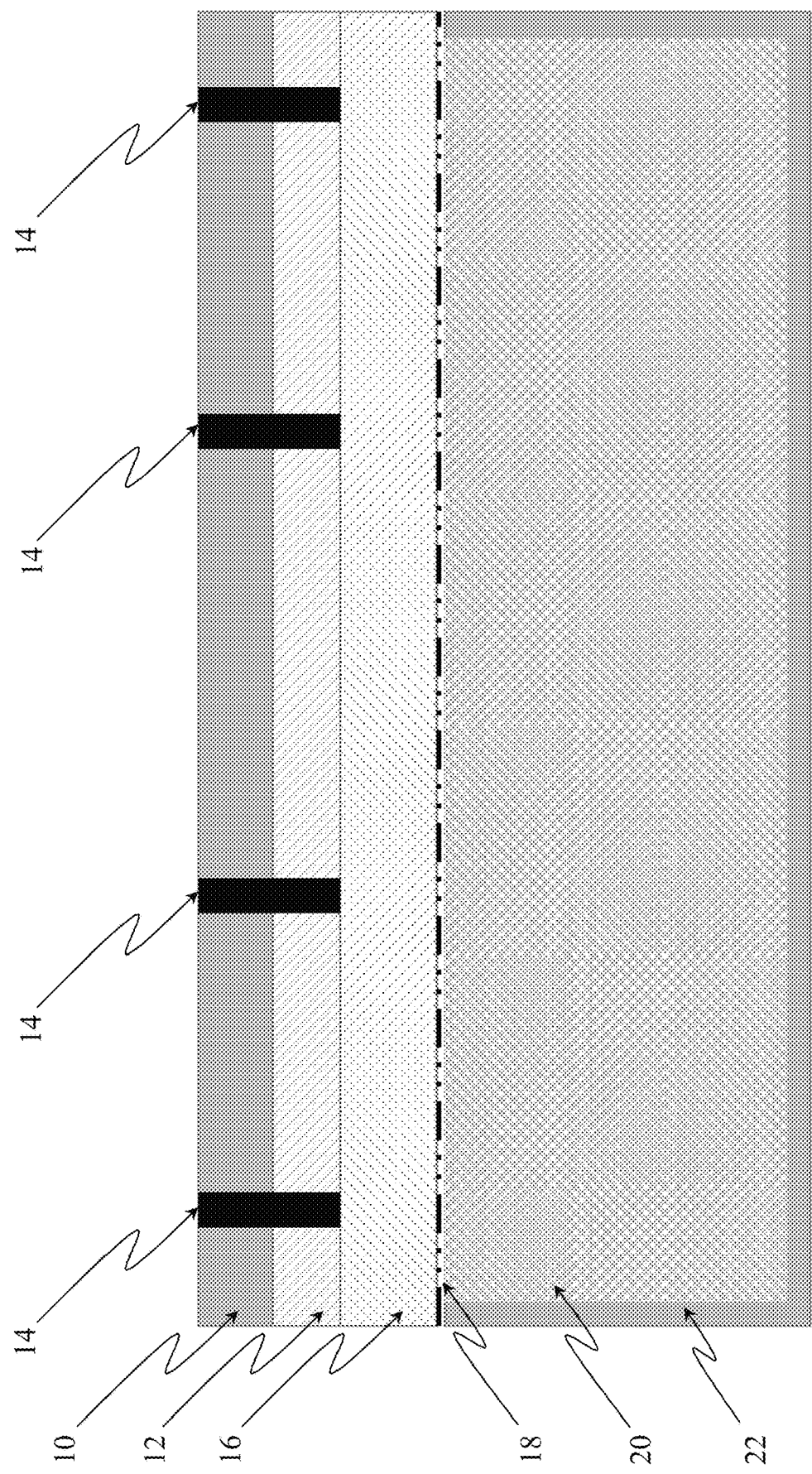
FIG. 2 is a simplified, cross-sectional schematic diagram of a perforated, stacked-membrane insect bait station with a leak-proof bait reservoir, according to embodiments of the present invention.

FIG. 2 is a simplified, cross-sectional schematic diagram of a perforated, stacked-membrane insect bait station with a leak-proof bait reservoir, according to embodiments of the present invention. The stacked-membrane insect bait station is shown having a protective outer membrane 10 and an adhesive inner membrane 12. Perforations 14 are shown penetrating protective outer membrane 10 and an optional adhesive inner membrane 12. Adhesive inner membrane 12 is in direct contact with a pierceable support layer 16. An optional hydrophobic layer 18 is shown in FIG. 1 in direct contact with pierceable support layer 16. A liquid-based bait core (not shown) is impregnated in a suitable absorbent material 20 occupying a bait reservoir enclosure 22. The liquid-based bait core includes a bait, a bait solvent (e.g., water), and at least one oral and/or contact insect toxin. Other components of the bait core may include an odorant or other volatile materials as an insect attractant.

Protective outer membrane 10 can be made of a suitable membrane that can be non-permeable or semi-permeable (i.e., to volatile components) such as polymeric and/or elastomeric materials, and that can be formed into protective films that assist in preventing erosion, sagging, and cold flow of the bait core as well as lowering surface tack. Materials for forming protective films with suitable thickness and hardness (e.g., less than 100 microns thick and a hardness of less than 60 Shore A) include polymeric materials such as thermoplastics, thermosetting polymers, carbon black-filled butyl rubber, acrylic polymer, plasticized PVC, high-density polyethylene (HDPE), low-density polyethylene (LDPE), polypropylene (PP), polyurethanes, neoprene, natural rubber, and butadiene rubber. Such materials may contain elastomers (e.g., polydimethyl siloxanes (PDMS), silicone rubbers, silicone elastomers, silicone gels, ethylene-vinyl acetate, ethylene-acrylic ester copolymers and terpolymers, ethylene-propylene rubber, plastomers such as ethylene-hexene and ethylene-octene copolymers, thermoplastic vulcanized rubber (TPV); hydrogenated block styrene-ethylene butylenes (SEBS); and block styrene isoprene (SIBS).

Such materials may further contain plasticizers (e.g., aliphatic polyesters) and light stabilizers (e.g., UV stabilizers), as well as other additives such as carbon black, pigments and dyes, fillers, and bactericides, fungicides, and other microbial-activity suppressants. Such protective films assist in physically supporting the bait core in order to prevent sagging and cold flow, while allowing for effusion of volatile components of the bait core. Such considerations become increasingly important when deploying such bait stations in a substantially vertical orientation in which gravity-driven loss of bait can occur using conventional films.

Protective outer membrane 10 can be bonded to pierceable support layer 16 applying an adhesive (e.g., glue) either uniformly or at certain points between protective outer membrane 10 can and pierceable support layer 16.

Optional adhesive inner membrane 12 can be semi-permeable (or at least only partially covering the contact surface to allow volatile components to outwardly diffuse from the bait core), and serves to maintain direct contact between protective outer membrane 10 and pierceable support layer 16. Since adhesive inner membrane 12 includes perforations 14 as well, a non-permeable material can be readily employed while still allowing for outward diffusion of volatile components. Adhesive inner membrane 12 can be formed from elastomeric polymers like ethylene-vinyl acetate (EVA). Pierceable support layer 16 assists in maintaining structural integrity of the stacked-membrane composite layer of protective outer membrane 10 and adhesive inner membrane 12.

Pierceable support layer 16 can be semi-permeable (or at least only partially covering the contact surface to allow volatile components to outwardly diffuse from the bait core) in order to allow volatile components to be released. Pierceable support layer 16 can be made of a woven or non-woven material such as mechanically-roughened materials (e.g., reinforced cardboard and plastic) as well as materials constructed to have high surface area (e.g., woven functional fabrics and meshes, open-pore foams, fibrous mats, corrugated materials, and "honeycomb" fabricated materials).

Perforations 14 prevent rain (or other moisture) from causing sugar sources in the liquid-based bait core to swell due to water penetration or wash away (i.e., erode), while allowing easy insect-probe penetration. Perforations 14 enable, inter alia, the bait to increase diffusion of volatile components from the liquid-based bait core to the exterior of protective outer membrane 10 and its surrounding environment in order to attract insects, and ease penetration of an insect probe to selectively access the liquid-based bait core by providing weakened points in the surface of protective outer membrane 10.

By selective access, it is meant that (1) organisms with a suitable proboscis can access the inner portion of bait station (i.e., the bait core), and (2) protective outer membrane 10 provides access to the volatile components of the bait core via perforations 14. In the case that protective outer membrane 10 is semi-permeable, additional access to such volatile components is facilitated through protective outer membrane 10 itself.

Perforations 14 enable a greater variety of materials to be implemented for protective outer membrane 10 by facilitating the outward diffusion of volatile components of the bait, thereby allowing non-permeable materials to be employed for protective outer membrane 10. Perforation size and frequency is optimized in order to enhance diffusion of volatile components to the outside, and allow easier insect-probe penetration through protective outer membrane 10, while retaining resistance to rain, dust adsorption, dew, and sunlight to a greater extent than baits without a protective membrane.

The stacked-membrane composite layer can be perforated by applying a physical or chemical process to the dried skin. Examples for physical perforation include mechanical puncturing, laser drilling and sand blasting. An example for chemical perforation includes the dispersal of particles of a water-soluble compound (such as sugar or salt) in the stacked-membrane composite layer, which is then exposed to water or steam to dissolve the particles, leaving holes in the layer. In some embodiments, the average aperture diameter (or average diameter, if irregular in shape) of perforations 14 varies from about 0.1 micron to 1 millimeter. Typically, an average diameter about 100 microns for perforations 14 is suitable. In other embodiments, the average diameter varies from about 1 to 50 microns. In some embodiments, the average perforation density varies between about 0.01-1 million apertures/cm$^2$. Typically, a perforation density of about 1 aperture/cm$^2$ is suitable.

Optional hydrophobic layer 18 may be either an independent penetrable layer or a hydrophobic coating applied (e.g., spray-coated or immersed) to pierceable support layer 16 along its bait-contacting surface. In some embodiments, pierceable support layer 16 is made of a non-woven material that has intrinsic hydrophobic characteristics.

Optional hydrophobic layer 18 further prevents penetration of water into bait reservoir enclosure 22, and further prevents the liquid-based bait core from seeping out through the stacked-membrane composite layer. Such bait leakage through perforations 14 can be hazardous to non-target insects, and can cause loss of bait, sagging, clogging of the membranes, and/or degradation through contamination, reducing the longevity and effectivity of the bait station.

Absorbent material 20 is used to contain the liquid-based bait core and restrain the bait's fluidity in order to further prevent bait leakage. Absorbent material 20 can be formed from fabric-based materials or cellulose-based sponges. A fibrous material made of fibrous cloths or sheets, or a folded roll or sheet can be employed to provide improved sagging resistance to the liquid-based bait core, especially when the bait stations are deployed on vertical or sloped surfaces. The improved sagging resistance is obtained by adsorption of liquid-based bait core into a cloth, fabric, paper, sponge, open-pore foam or fibrous mat; and/or impregnating absorbent material 20 with the liquid-based bait core. In some embodiments, absorbent material 20 includes fibers or whiskers of cotton, straw, bamboo, pineapple, ramie, cellulose, hemp, flax, sisal, coir, paper, wood, stems, leaves, rayon, polyester, polyamide, polyacrylonitrile, viscose, jute, polypropylene, polyethylene, and lyocell.

In other embodiments, absorbent material 20 includes open-cell polyurethane foam, polyurea foam, melamine foam, silicone foam, or polyolefin foam. In other embodiments, the weight ratio between the liquid-based bait core and absorbent material 20 varies from about 0.01-100. The liquid-based bait core is integrated with absorbent material 20 by dipping, pressing, spraying, squeezing, roller coating, vacuum impregnating, and/or molding under pressure the liquid-based bait core onto absorbent material 20. Bait reservoir enclosure 22 can be any suitable support material.

Figure 3:
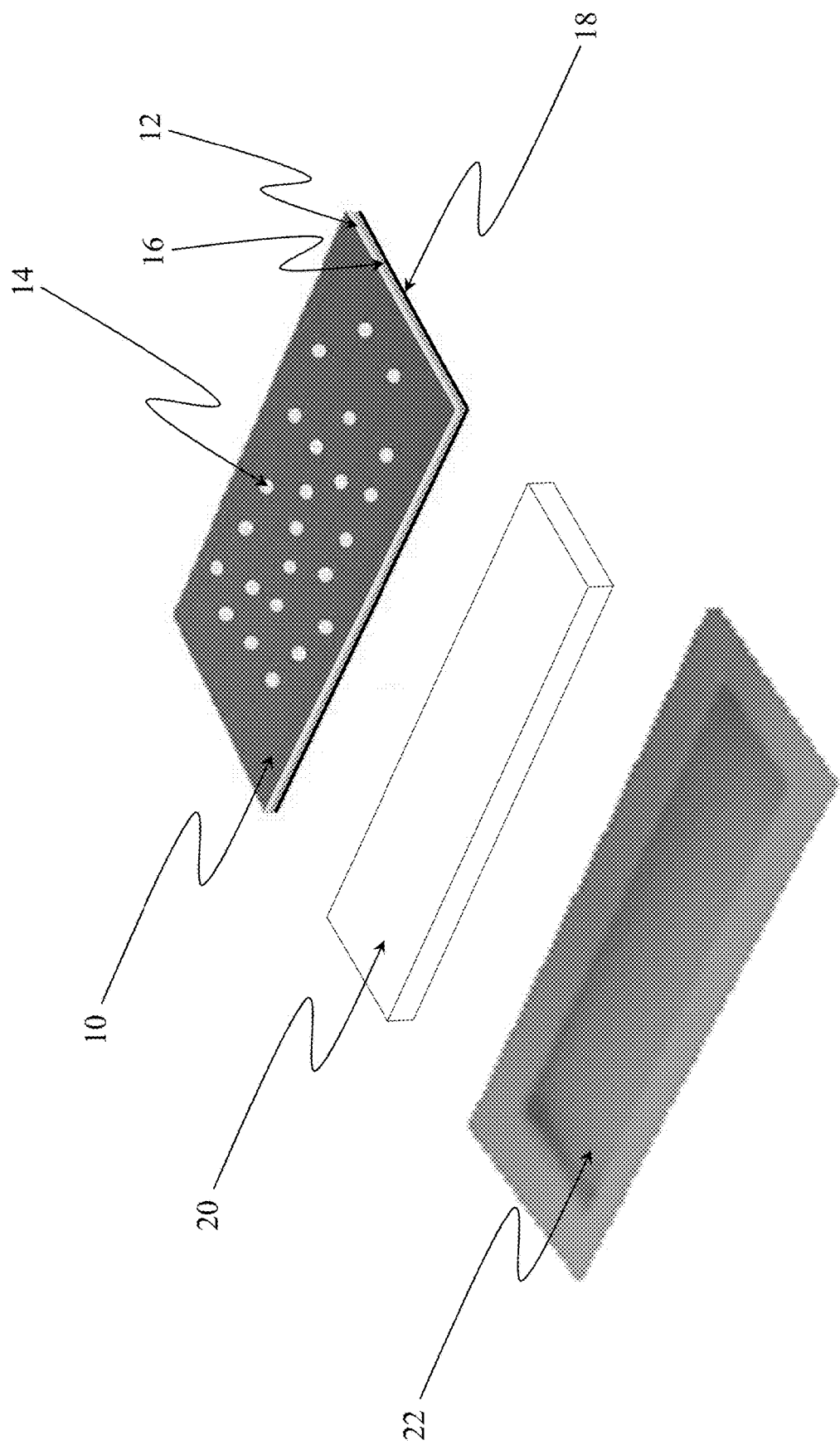
FIG. 3 is an exploded perspective view of the main components of the perforated, stacked-membrane insect bait station of FIG. 2, according to embodiments of the present invention.

FIG. 3 is an exploded perspective view of the main components of the perforated, stacked-membrane insect bait station of FIG. 2, according to embodiments of the present invention. The stacked-membrane composite layer of protective outer membrane 10 (shown with perforations 14) is shown with an edge view of adhesive inner membrane 12, pierceable support layer 16, and hydrophobic layer 18.

FIG. 4A is a top view of the protective outer membrane with its perforations of the stacked-membrane insect bait station of FIG. 2, according to embodiments of the present invention. Protective outer membrane 10 and perforations 14 are shown. FIG. 4B is a top view of the protective outer membrane with its perforations of the stacked-membrane insect bait station of FIG. 2 showing the underlying pierceable support layer through the perforations, according to embodiments of the present invention. Pierceable support layer 16 is shown under protective outer membrane 10 through perforations 14.

FIG. 4C is a top view, close-up image of the protective outer membrane with a single perforation of the perforated, stacked-membrane insect bait station of FIG. 2 showing the underlying pierceable support layer through the perforation, according to embodiments of the present invention. The outward-facing side of protective outer membrane 10 is shown, composed of a black polyethylene (PE) sheet laminated to a polyethylene-polypropylene (PE-PP), non-woven fabric, which is pierceable support layer 16, showing through a laser-drilled perforation 14. The aperture of perforation 14 is further fragmented into pores 30 by the non-woven fibers of pierceable support layer 16 located on the other side of protective outer membrane 10. It is noted that woven pattern is shown embossed into the PE sheet of protective outer membrane 10 due to the manufacturing process, but is not required for the proper functioning of the bait station.

EXPERIMENTAL STUDIES

Figure 5A:
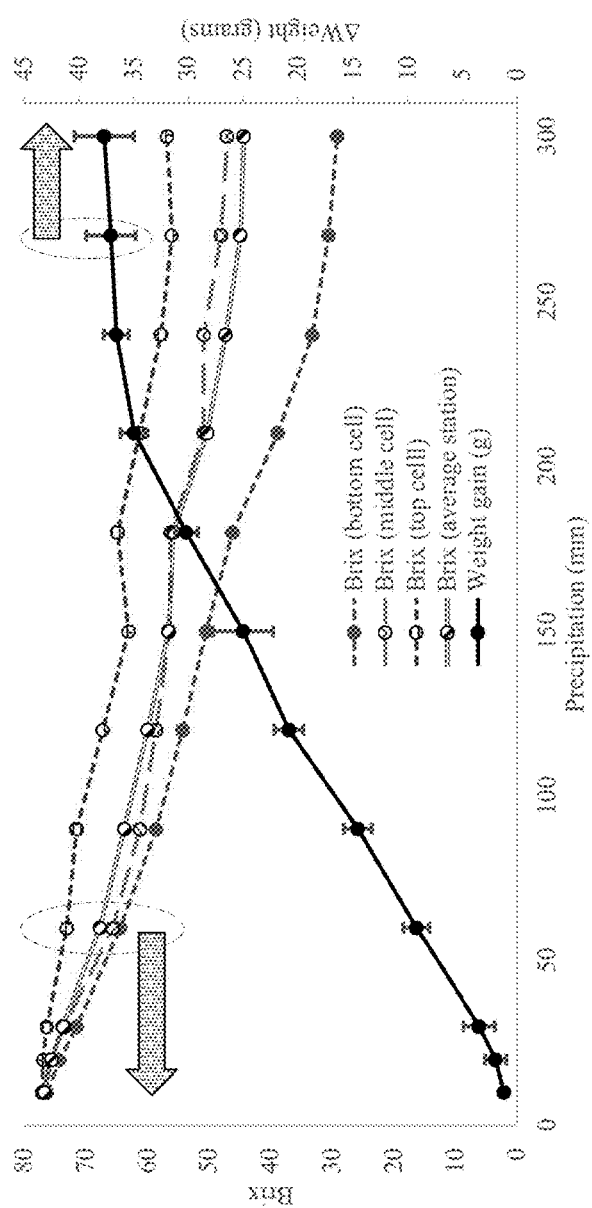
FIG. 5A is a graph depicting the effects of precipitation on the conventional, prior-art bait station of FIG. 1, according to embodiments of the present invention.

Water Penetration in Conventional, Prior-Art Bait Stations:

FIG. 5A is a graph depicting the effects of precipitation on the conventional, prior-art bait station of FIG. 1, according to embodiments of the present invention. Conventional bait stations, such as shown in FIG. 1, take up water at rates of ~10 ml for every 50 mm of rainfall. A rain-exposed bait station takes up water in a heterogenous fashion, with bottom bait reservoir enclosures taking up more water than top ones ("cell" in FIG. 5A).

The left-sided y-axis in FIG. 5A is labeled as "Brix"—the Brix number is the sugar content of an aqueous solution expressed as percent sucrose, and is a measure of bait dilution by infiltrating water. One Brix is 1 gram of sucrose in 100 grams of solution, and represents the strength of the solution as percentage by mass. Cells refer to the array of miniature bait containers in the bait station.

Figure 5B:
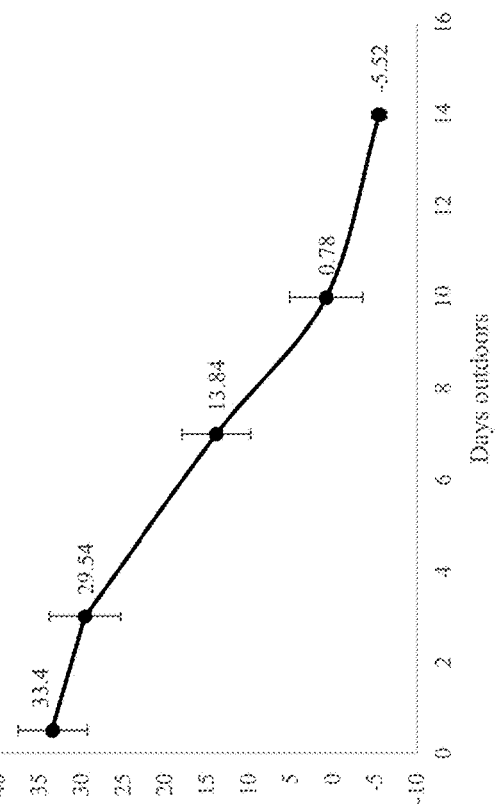
FIG. 5B is a graph depicting the effects of outdoor environmental conditions on the conventional, prior-art bait station of FIG. 1, according to embodiments of the present invention.

The weight gain is indicated on the right axis (as indicated by the arrows). While uptake of water may dilute the bait, upon drying out, the bait can dehydrate to its initial weight and sugar concentrations. However, if the sugar concentration falls below ~65%, the bait may start spoiling due to decreased inhibition of metabolic activity and growth of microbes, leading to a reduction in efficacy of ~10-30% until the bait dehydrates to >65% sugar concentration. Moreover, if bait stations are exposed to continuous rain, liquid-based bait core 4 is diluted, and eventually leaks out of the bait station, reducing the amount of bait within the bait station, leading to a bait loss of between 50-75% after exposure to 250 mm of rain or more. FIG. 5B is a graph depicting the effects of outdoor environmental conditions on the conventional, prior-art bait station of FIG. 1, according to embodiments of the present invention.

Rupture of membrane 2 of FIG. 1 does not lead to significant reduction in efficacy (if only one "cell" of the bonded cluster in the bait station is affected). However, such rupture of membrane 2 may lead to non-target organisms (e.g., bees) gaining access to liquid-based bait core 4, thereby reducing the amount of bait in the cell, and exposing such non-target organisms to a potentially lethal bait. This kind of bait station results in excessive bait leakage of liquid-based bait core 4, primarily through some weak welding points between the membrane and the back layer.

Bait Leakage in Conventional, Prior-Art Bait Stations and Bait Stations with Leak-Proof Bait Reservoirs:

In order to reduce bait leakage through poor bonding seams, a type of rayon material (viscose) was added to bait reservoir enclosure 22. The addition of rayon reduced the bait leakage to a noticeable extent, but still not enough. An absorbent material (compressed cellulose) that effectively absorbs the liquid-based bait core was a much better solution and reduced the bait leakage significantly. Pieces of cellulose acting as sponges were implemented as absorbent material 20, achieving even better results than the viscose. Table 1 provides data showing the effect of the compressed cellulose as absorbent material 20 on bait leakage.

TABLE 1

Results obtained for leaking bait stations with and without absorbent materials used.

| Type of bait station | Total station shipment | Number of leaking stations | Leakage percentage |
| --- | --- | --- | --- |
| Bait stations without absorbent material | 1,335 | 979 | 73% |
| Bait stations with absorbent material | 2,886 | 67 | 2% |

Bait Leakage and Water Penetration in Perforated-Membrane Bait Stations:

Throughout bait-station development, it was also found that the feeding behavior of biting flies such as mosquitoes is greatly enhanced when using a perforated outer membrane. However, with such perforations in the membrane, the problem of bait leakage returned. Perforated membranes in field tests also allowed for water penetration into the liquid-based bait core in instances of heavy rain. Such water penetration diluted the liquid-based bait core, thereby reducing the efficiency of the bait station as well as increasing the likelihood of bait leakage.

To address both issues of bait leakage and rain-induced water penetration in a perforated membrane, a non-woven fabric as pierceable support layer 16 was laminated to the underside of the perforated stacked membrane. The non-woven layer functions as a permeable mesh that restricts liquids flow in and out through the membrane's apertures. In order to further reduce the rain-induced water penetration into bait reservoir enclosure 22, the non-woven fabric was treated with hydrophobic material 18.

Figure 6:
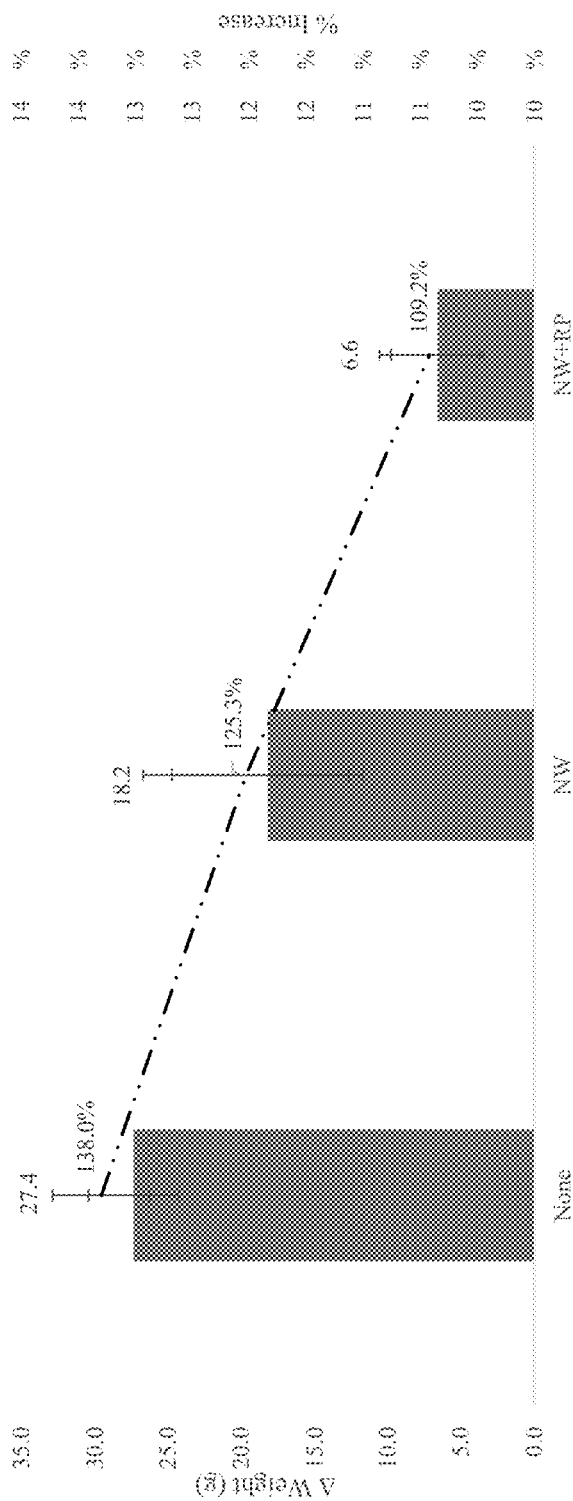
FIG. 6 is a graph depicting the effects on water penetration of a non-woven material for the pierceable support layer and a hydrophobic material in the perforated, stacked-membrane composite layer of the perforated, stacked-membrane insect bait station of FIG. 2, according to embodiments of the present invention.

FIG. 6 is a graph depicting the effects on water penetration of a non-woven material for the pierceable support layer and a hydrophobic material in the perforated, stacked-membrane composite layer of the stacked-membrane insect bait station of FIG. 2, according to embodiments of the present invention. Weight gain and percent increase due to water infiltration following 30 min. of heavy-rain simulation (corresponding to 100 mm precipitation) are shown for bait stations with: a perforated PE sheet without non-woven fortification (referred to as "None" on the x-axis) as the pierceable support layer, a PE-PP non-woven fabric laminated to the PE sheet (referred to as "NW") as the pierceable support layer, and the same non-woven fabric as the pierceable support layer treated with a water-repelling petroleum distillate as the hydrophobic coating (referred to as "NW+RP"). The hydrophobic-coated, non-woven layer significantly reduced bait leakage and rain-induced water penetration, with average weight gain and standard deviation indicated as well as percent increase of the bait within the bait station (represented by the dashed line).

The entire configuration of the bait station reduces both outflow of the liquid-based bait core and inflow of environmental precipitation (e.g., rainwater), while still allowing (1) attractants to evaporate and diffuse out of the bait station, and (2) mosquitoes to probe the perforations for feeding on the bait.

While the present invention has been described with respect to a limited number of embodiments, it will be appreciated that many variations, modifications, and other applications of the present invention may be made.

What is claimed is:

1. A device for a perforated, stacked-membrane insect bait station, the device comprising:
   (a) a protective outer membrane for providing selective access to the bait station;
   (b) perforations in said protective outer membrane, wherein said perforations are configured to facilitate easy insect-probe penetration for mosquitoes and other biting flies, and are configured to facilitate outward diffusion of volatile components of the bait station;
   (c) a pierceable support layer for preventing inward water penetration via said perforations and for preventing outward bait leakage via said perforations, wherein said protective outer membrane, said perforations, and said pierceable support layer form a stacked-membrane composite layer;
   (d) an absorbent material for providing a reservoir for containing liquids in the bait station and for restraining bait fluidity;
   (e) a liquid-based bait core for providing bait to the insect bait station, said liquid-based bait core including a bait, at least one oral and/or contact insect toxin, and a solvent, said bait core configured to be absorbed in said absorbent material and to be substantially in contact with said pierceable support layer;
   (f) a bait reservoir enclosure for housing said liquid-based bait core absorbed in said absorbent material; and
   (g) a hydrophobic layer for further preventing said inward water penetration through the outer membrane and for further preventing said outward bait leakage from the bait station, said hydrophobic layer, as part of said stacked-membrane composite layer, positioned between said pierceable support layer and said absorbent material and in direct contact with opposing sides of said pierceable support layer and said absorbent material, wherein said hydrophobic layer is a coating on said pierceable support layer, and wherein said coating is formed from a substance including a petroleum distillate.

2. The device of claim 1, the device further comprising:
   (h) an adhesive inner membrane, as part of said stacked-membrane composite layer, positioned between said protective outer membrane and said pierceable support layer and in direct contact with opposing sides of said protective outer membrane and said pierceable support layer, said adhesive inner membrane having said perforations identically positioned as in said protective outer membrane.

3. The device of claim 1, wherein said perforations have an average diameter of about 100 microns.

4. The device of claim 1, wherein said protective outer membrane has a perforation density of about 1 aperture/cm$^2$.

5. The device of claim 1, wherein said pierceable support layer is made from a non-woven material.

6. The device of claim 5, wherein said non-woven material has intrinsic hydrophobic characteristics.

7. The device of claim 1, wherein said bait core further includes an odorant.

8. The device of claim 1, wherein said coating is formed by spray-coating said pierceable support layer with said substance and/or immersing said pierceable support layer in said substance.

* * * * *